United States Patent
Zimmermann

(10) Patent No.: US 6,332,517 B1
(45) Date of Patent: Dec. 25, 2001

(54) METHOD FOR ADAPTING A TORQUE CONVERTER LOCK-UP CLUTCH

(75) Inventor: Bernd Zimmermann, Gundelsheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/509,177

(22) PCT Filed: Oct. 5, 1998

(86) PCT No.: PCT/EP98/06315

§ 371 Date: Mar. 22, 2000

§ 102(e) Date: Mar. 22, 2000

(87) PCT Pub. No.: WO99/19645

PCT Pub. Date: Apr. 22, 1999

(30) Foreign Application Priority Data

Oct. 10, 1997 (DE) .............................. 197 44 697

(51) Int. Cl.[7] .................................................. F16H 61/14
(52) U.S. Cl. .............................. 192/3.3; 192/3.28
(58) Field of Search .................... 192/3.28, 3.3; 477/176, 174, 180

(56) References Cited

U.S. PATENT DOCUMENTS

| | | | |
|---|---|---|---|
| 4,582,182 | 4/1986 | Takeda et al. | 192/3.31 |
| 4,660,697 | 4/1987 | Yoneda et al. | 192/0.033 |
| 4,989,471 | 2/1991 | Bulgrien | 192/0.096 |
| 5,160,002 | 11/1992 | Suzuki | 192/3.31 |
| 5,332,073 | 7/1994 | Iizuka | 192/3.3 |
| 5,737,979 | 4/1998 | McKenzie et al. | 74/731.1 |

FOREIGN PATENT DOCUMENTS 41 11 081 A1  10/1991  (DE) .
195 13 694 C1  10/1996  (DE) .

OTHER PUBLICATIONS

Hein, Dr. Ing. L., Dipl. Ing. H. Nauerz and Dipl. Ing. O. Wörner, "*Aufbau und Steuerung einer schlupfgeregelten Überbrückungskupplung im hydrodynamischen Drehmomentwandler*" in VDI Berichte Nr. 1175, 1995, pp. 319–337.

Primary Examiner—Charles A Marmor
Assistant Examiner—Saùl Rodrìguez
(74) Attorney, Agent, or Firm—Davis & Bujold, P.L.L.C.

(57) ABSTRACT

For a torque converter lock-up clutch (7) a method is proposed in which an application pressure is adapted. To this end, within a first interval, a pressure change is output after a transition function and the existence of the reaction of the torque converter lock-up clutch is tested after output of the application pressure during an application phase from an electronic gear control (13). In the absence of reaction, additional intervals are then output. The application phase is then terminated when the reaction of the torque converter lock-up clutch occurs. The control/regulating phase for the torque converter lock-up clutch (7) follows after the application phase terminates.

7 Claims, 3 Drawing Sheets

METHOD FOR ADAPTING A TORQUE CONVERTER LOCK-UP CLUTCH

BACKGROUND OF THE INVENTION

The invention relates to a method for adapting a torque converter lock-up clutch in an automatic transmission where an electronic gear control outputs an application pressure upon detecting the need of a change of state of the torque converter lock-up clutch. From revertive variables, the electronic gear control detects a change of state of the torque converter lock-up clutch during a control/regulating phase. The electronic gear control then determines therefrom an adaptation value for the application pressure.

In torque converter lock-up clutches, the problem arises in the practice that the application behavior thereof clearly depends on the mechanical axial play of the system, the so-called release play. A different release play causes a different operating comfort during state changes of the torque converter lock-up clutch, such as from open to regulated or from open to closed. DE-OS 41 11 081 proposes as solution for this that during a controlled/regulated transition from open to closed the application pressure be tested by measuring the change of the slip within a preset period of time. The application pressure is then adequately adapted according to the time period measured.

Based on the above described prior art, the problem to be solved by the invention is further to develop the prior art.

SUMMARY OF THE INVENTION

According to the invention, the problem is solved in that after output of the application pressure an application phase for the torque converter lock-up clutch follows wherein, during the application phase, the electronic gear control outputs, within a first interval, a pressure change after a transition function and tests the existence of the reaction of the torque converter lock-up clutch. In the absence of reaction, the electronic gear control then outputs further intervals. The application phase ends when a reaction of the torque converter lock-up clutch occurs, the electronic gear control then continuing with the control/regulating phase. According to claim 2, the reaction of the torque converter lock-up clutch may be detected when a differential rotational speed calculated from pump and turbine rotational speeds falls below a limit value. The inventive solution offers the advantage of it being possible to enlarge the tolerances within the limits of which must lie the produced hydrodynamic torque converters, including the torque converter lock-up clutch. This results in a corresponding lowering of cost.

In a development of the invention, it is proposed that the new application pressure be calculated by weighting, with a factor, the pressure value existing during occurrence of the reaction of the torque converter lock-up clutch.

In one other development of the invention, it is proposed that as an additional safety function the intervals output during the application phase is added up and an error is entered in a diagnosis system when the addition exceeds a limit value. As consequent reaction, it is then possible, as proposed in claim 5, to activate a substitute program by means of which the preset state changes of the torque converter lock-up clutch, e.g. the regulated operation, is no longer permitted.

In another development, it is proposed that with the beginning of the method for adapting the torque converter lock-up clutch, a time step is started and a renewed method for adaptation be applied only when the time step exceeds a limit value. Therefore, it is hereby taken into consideration that the changes of the torque converter lock-up clutch, such as friction value change, occur slowly. It is thus enough, when the adaptation method is operated with long periods of time. Thus, there results altogether the advantage of a quicker program sequence.

BRIEF DESCRIPTION OF THE DRAWING

The drawings show a preferred embodiment wherein.

DESCRIPTION OF THE PREFERRED EMBODIMENT

Figure 1:
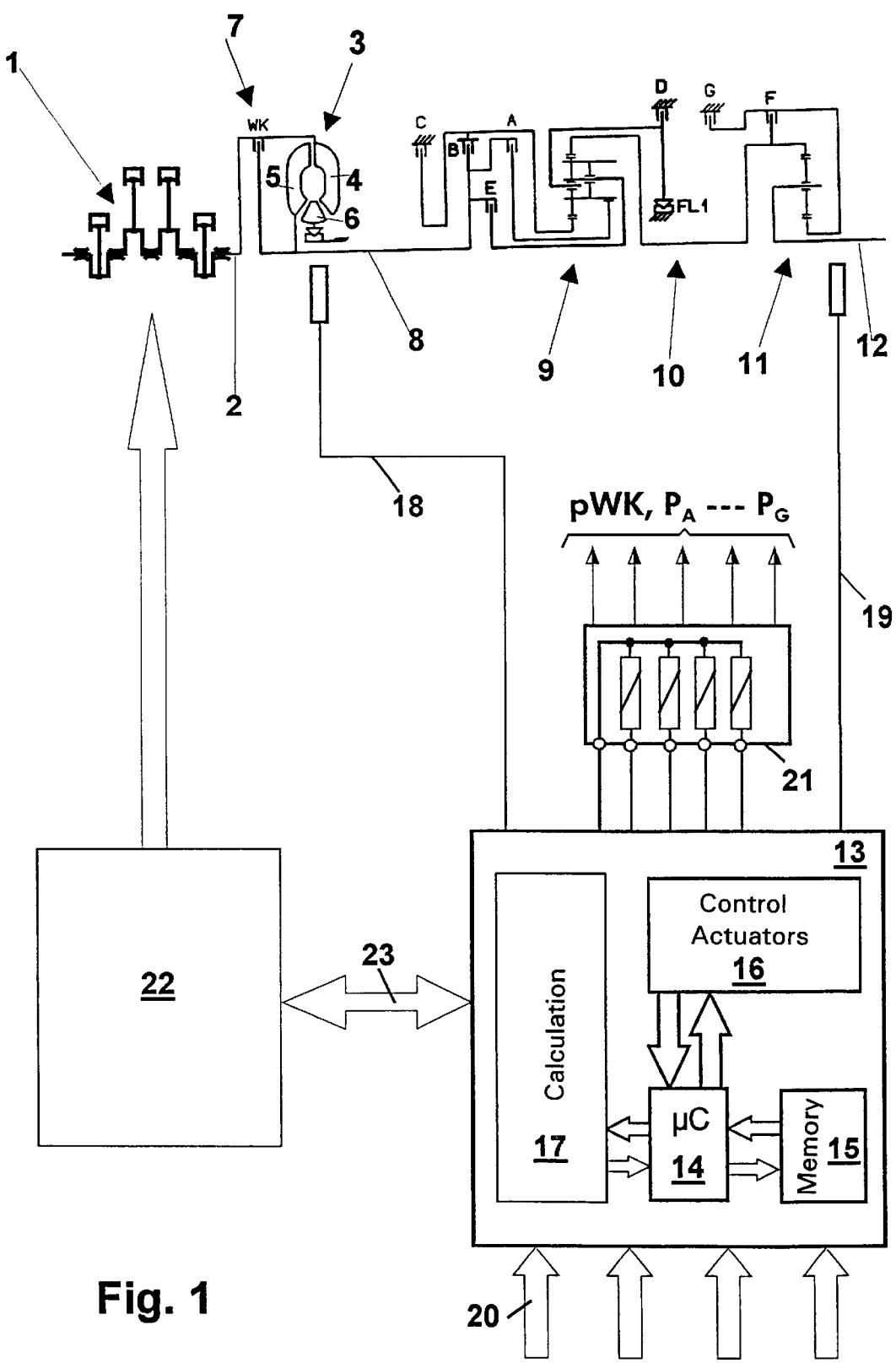
FIG. 1 is a system diagram.

FIG. 1 shows a system diagram of an automatic transmission. It consists of the mechanical part proper, a hydrodynamic torque converter 3, a hydraulic control unit 21 and an electronic gear control 13. The automatic transmission is driven by a drive unit 1, preferably an internal combustion engine, via an input shaft 2. The latter is non-rotatably connected with the impeller 4 of the hydrodynamic torque converter 3. As known per se, the hydrodynamic torque converter 3 consists of an impeller 4, a turbine wheel 5 and a stator 6. A torque converter lock-up clutch 7 is situated parallel with the hydrodynamic torque converter 3. The torque converter lock-up clutch 7 and the turbine wheel 5 lead to a turbine shaft 8. When the converter lock-up clutch 7 is actuated, the turbine shaft 8 has the same rotational speed as the input shaft 2. The mechanical part of the automatic transmission consists of clutches and brakes A to G, a free wheel 10 (FL1), a Ravigneaux set 9 and a rear-mounted planetary gear set 11. The output takes place via a transmission output shaft 12. The latter leads to a differential (not shown), which drives the output of a vehicle (not shown), via two axle half shafts. A gear step is established by a clutch-brake combination. Since the mechanical part is not relevant for further understanding of the invention, a detailed description is omitted.

Depending on the input variables 18 to 20, the electronic gear control 13 selects a drive step. Via the hydraulic control unit 21, where electromagnetic actuators are located, the electronic gear control 13 then activates a clutch/brake combination and controls/regulates the state of the torque converter lock-up clutch. During the shift transitions, the electronic gear control 13 determines the pressure curve of the clutches/brakes taking part in the gear shift. In the electronic gear control 13, there are shown as blocks in simplified form: micro-controller 14, memory 15, function block control actuators 16 and function block calculation 17. In the memory 15 are stored the data relevant to the transmission. Data relevant to the transmission are, e.g. programs and specific characteristic values of the vehicle, adaptation values and diagnosis data and shift characteristic fields. The memory 15 is usually designed as EPROM, EEPROM or buffered RAM. In the function block calculation 17 are calculated the data relevant for a shift curve. The function block control actuators 16 serves for control of the actuators located in the hydraulic control unit 21. Input variables 20 are fed to the electronic gear control 13. Input variables are, e.g. a variable representative of the driver's desired performance, such as the accelerator pedal/throttle valve position or manual gear shift requirements, the signal of the torque generated by the internal combustion engine, the rotational speed and temperature of the internal combustion engine, etc. The specific data of the internal combustion engine are provided by an engine control unit 22, via data line 23. As additional input variables the electronic gear control 13 receives the rotational speed of the turbine wheel 18 and of the transmission output shaft 19.

Figure 2:
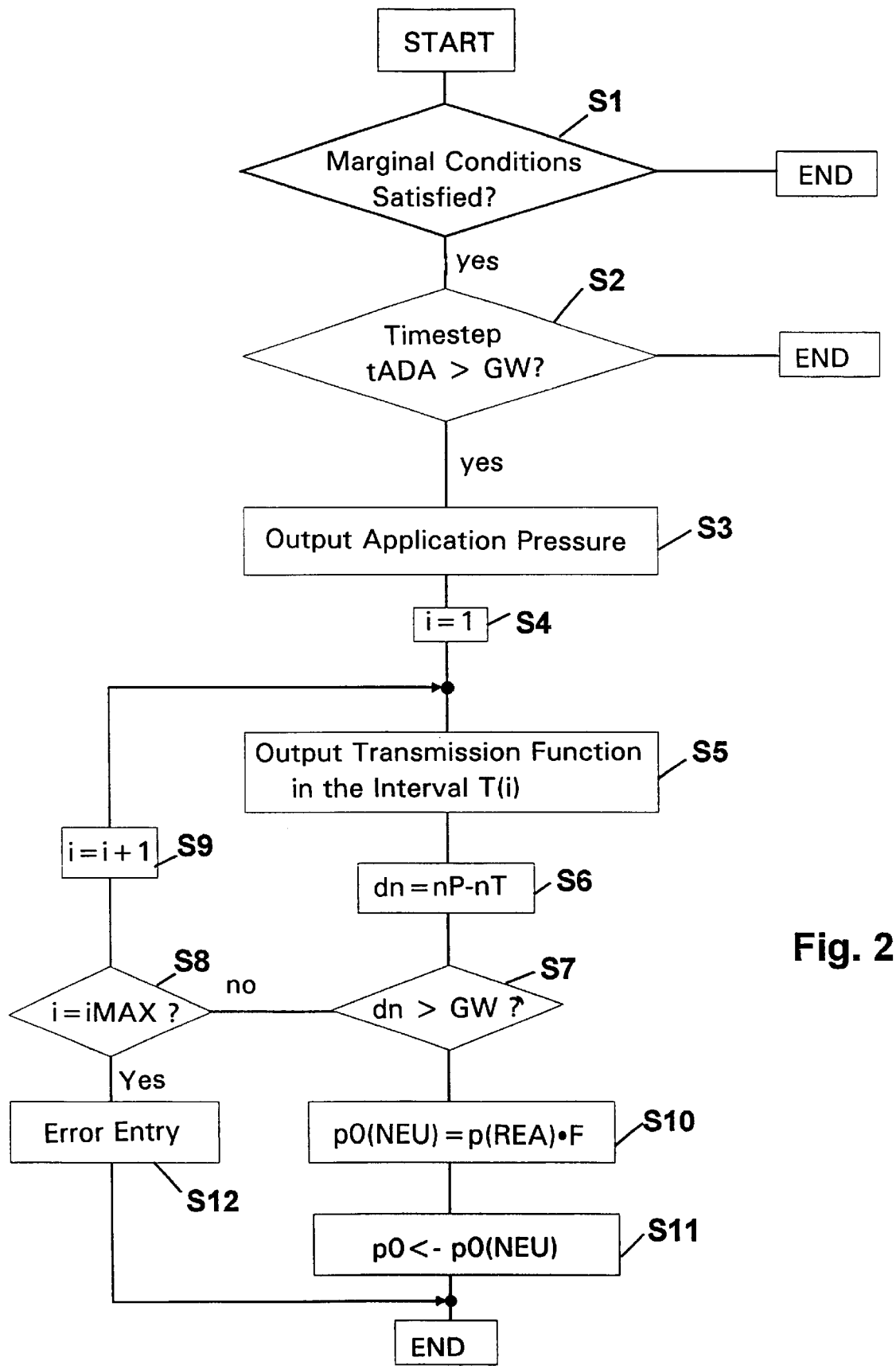
FIG. 2 is a program sequence plan.

In FIG. 2 is shown a program flow chart for the adaptation method of the torque converter lock-up clutch. This starts at step S1 with the inquiry of whether the marginal conditions have been satisfied. These are satisfied when:

the transmission oil temperature theta (ATF) is higher than a limit value and coasting operation has been detected and the rotational speed of the input unit nMOT is higher than a limit value.

If the marginal conditions have not been satisfied, the program terminates. In case of positive inquiry, it is then tested in step S2 whether a time step tADA is greater than a limit value. The time step tADA is started after a first adaptation value has been determined. This time step causes a new adaptation be carried out, only after lapse of said time step, e.g. 40 hours. Thereby is taken into account the circumstance in which an operation of the torque converter lock-up clutch occurs only very slowly. In case of negative inquiry, i.e. the time step tADA still has not lapsed, the program terminates. In case of positive inquiry result in step S2, an application pressure p0 is output in step S2. In step S4, a counting variable i is preset. In step S5, the electronic gear control 13 then outputs a transition function in the interval T(i). The transition function is shown in FIG. 3B.

Thereafter in step S6 follows a calculation of the rotational speed difference dn from the pump rotational speed nP minus the turbine rotational speed nT. In step S7, it is tested whether the rotational speed difference is higher than a limit value. If this is not the case, i.e. still no reaction of the torque converter lock-up clutch can be measured, in step S8 is inquired whether the counting variable i has reached a maximum value iMAX. This is the case when the electronic gear control has output a preset number of intervals T(i) without a reaction of the torque converter lock-up clutch having been detected. In this case, an error entry in the diagnosis and the activation of a substitute program follow in step S12. The effect of this is that the preset state changes of the torque converter lock-up clutch, such as the regulated operation, are no longer admitted. Thereafter the program sequence terminates.

If the counting variable i still has not reached the maximum value, the variable is increased by one in step S9 and the loop is continued with step S5 with the renewed output of the transition function in the interval T(i+1). In step S7, if it is established that a reaction of the torque converter lock-up clutch exists, i.e. the rotational speed difference dn is more than the limit value GW, then in step S10 the new application pressure p0(NEU) is calculated by weighing the pressure level at which the reaction of the torque converter lock-up clutch appeared, p(REA) with one factor. In the practice, it is obviously possible to use, instead of the pressure p(REA), the current value output by the electronic gear control to the electromagnetic actuator. Thereafter the new application pressure p0(NEU) is stored in step S11 as an actual application pressure. Thereafter the program flow chart terminates.

Figure 3A:
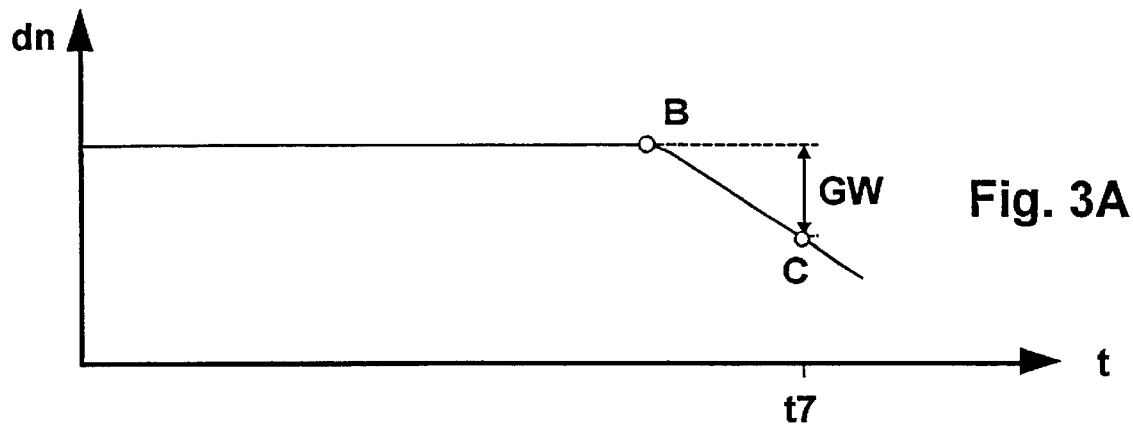
FIGS. 3A and 3B a time diagram.
Figure 3B:
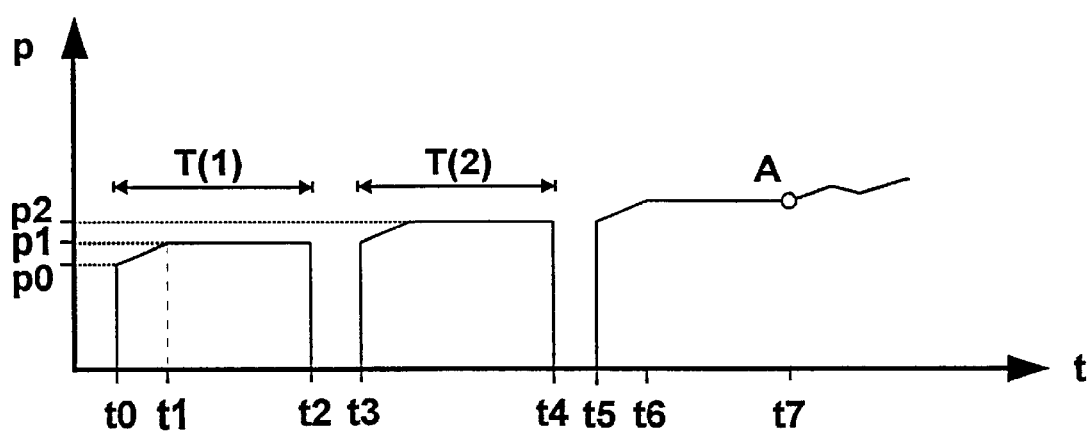

FIG. 3 comprises two parts, FIGS. 3A and 3B. Here each one shows in the course of time:

FIG. 3A the curve of the rotational speed difference dn calculated form the pump rotational speed nP minus the turbine rotational speed nT; and FIG. 3B the transition function for the pressure level of the torque converter lock-up clutch output by the electronic gear control during several intervals T(i).

The first interval T(1) starts at the t0 moment. This lasts up to the t2 moment. For the time period t0 to t1, the pressure level is increased linearly from the initial value p0 up to the value p1. For the time space t1 to t2, the pressure level remains constant. The transition function thus corresponds to the pressure curve p0 after p1 and after p2. During the time space t2 to t3, the electronic gear control tests whether a rotational speed difference dn appears. Since this is not the case, at the t3 moment the second interval T(2) begins. This lasts up to the time space t4. During the second interval T(2), the same transition function is output from the curve. Compared with the first interval T(1), the pressure level, however, is increased specifically to the pressure level p2. The test at the end of the second interval T(2), i.e. the t4 moment, results in that the rotational speed difference dn still has not changed. Thus at the t5 moment, the electronic gear control outputs a third interval. At the t6 moment, the rotational speed difference dn begins to change in point B. At the t7 moment, the rotational speed difference dn has fallen below a limit value GW in the point C. This is the case when the torque converter lock-up clutch is close. Thereafter the control/regulating phase for the torque converter lock-up clutch begins in point A. The pressure level in point A, which corresponds to p(REA) from FIG. 2, is weighed with a factor F. For the subsequent gear shifts of the torque converter lock-up clutch, a new application pressure p0 is thus output according to p0 =p(REA) x F.

Reference numerals 1 drive unit
2 input shaft
3 hydrodynamic torque converter
4 impeller
5 turbine wheel
6 stator
7 torque converter lock-up clutch
8 turbine shaft
9 ravigneaux set
10 free wheel fL1
11 planetary gear set
12 transmission output shaft
13 electronic transmission control
14 micro-controller
15 memory
16 function block control actuators
17 function block calculation
18 turbine rotational speed signal
19 transmission output rotational speed signal
20 input variables
21 hydraulic control unit
22 electronic engine control
23 data line

What is claimed is:

1. A method of adaptation of a torque converter lock-up clutch (7) of an automatic transmission comprising a) upon detection of the requirement of a change of state of said torque converter lock-up clutch an electronic gear control (13) outputs an application pressure (p0), during a control/regulating phase of a state change of said torque converter lock-up clutch (7), b) said electronic gear control (13) detects, from revertive variables, a reaction of said torque converter lock-up clutch (7) and therefrom determines an adaptation value for the application pressure (p0), c) after output of the application pressure (p0) there follows an application phase for said torque converter lock-up clutch (7), wherein d) during the application phase said electronic gear control (13) outputs, within a first interval (T(1)), a pressure change after a transition function and tests the existence of the reaction of said torque converter lock-up clutch (7), e) in the absence of reaction outputs additional intervals (T(i), i =2, 3, . . . n) wherein said electronic gear control (13) within said additional intervals (T(i), i =2, 3, . . . , n) outputs a pressure change based on the pressure at the end of the previous internal (T(i−1), i +2, 3, . . . , n) after the same transition function and f) the application phase terminates when a reaction of said torque converter clutch (7) occurs; said electronic gear control (13) thereafter continuing with the control/regulating phase.

2. The method according to claim 1, wherein the occurrence of the reaction of said torque converter lock-up clutch (7) is detected when a rotational speed difference (dn) calculated from pump (nP) and turbine (nT) rotational speeds falls below (dn<GW) a limit value (GW).

3. The method according to claim 2, wherein a new application pressure (p0(NEU)) is calculated by weighing a pressure value (p(REA)) existing when the reaction of said torque converter lock-up clutch (7) appears with a factor (F) (p0(NEU)=F·p(REA)).

4. The method according to claim 3, wherein intervals output during the application phase are added up (SUM(T(i))) and an error is entered in a diagnosis system (17) when the sum (SUM(T(i))) exceeds a limit value (SUM(T(i))) >GW).

5. The method according to claim 4, wherein, with the error entry, a substitution program is actuated by means of which preset state changes of said torque converter lock-up clutch (7) are no longer permitted.

6. The method according to claim 1, wherein with the beginning of the method for adaptation of said torque converter lock-up clutch, a time step (tADA) is started and a renewed method for adaptation is applied only when the time step (tADA) exceeds a limit value (GW).

7. The method according to claim 4, wherein the method for adaptation is applied only when the following conditions are satisfied:

i) the transmission oil temperature (theta(ATF)) is higher than a limit value (theta(ATF)>GW);

ii) coasting operation is detected; and iii) rotational speed of the internal combustion engine (nMOT) is higher than a limit value (nMOT>GW).

* * * * *